Patented Aug. 14, 1951

2,563,997

UNITED STATES PATENT OFFICE 2,563,997

STYRENE-BUTADIENE COPOLYMER AND
PROCESS OF PREPARING SAME

William E. Elwell and Richard L. Meier, Berkeley, Calif., assignors to California Research Corporation, San Francisco, Calif., a corporation of Delaware No Drawing. Application May 27, 1946,
Serial No. 672,703

4 Claims. (Cl. 260—83.7)

This invention relates to the manufacture of copolymers of 1,3-butadiene and a styrene.

The primary object of the present invention is to provide new and valuable copolymers of 1,3-butadiene and a styrene and a method of preparing the same. Another object is to provide copolymers of 1,3-butadiene and a styrene suitable for use in drying oils and varnishes. Still another object of the invention is to provide a new modified type of drying oil of improved characteristics and a method for incorporating styrene into such drying oil. Other objects will become apparent from the description of the invention as given hereinafter.

Copolymers of butadiene and styrene heretofore known and used in the art represent rubbery high molecular weight elastic bodies, generally produced by thermal or peroxide catalysis. Solutions of these copolymers in aromatic and chlorinated hydrocarbons are characterized by rather high viscosities. For instance, even the very dilute solutions containing only 2% to 5% by volume of these copolymers in benzene are found to be quite viscous. This property of high viscosity prevents the application of such copolymers in surface coatings.

At the same time it is highly desirable to have a resinous copolymer suitable for use in drying-type protection films and surface coatings, such as spirit varnishes, which would combine in itself the advantages inherent to polymerized styrene, viz., toughness and hardness of the surface upon drying, resistance to chemicals, low moisture absorption and low power factor with the high unsaturation of butadiene.

We have found that by passing boron fluoride catalyst at low or moderate temperature through a mixture of 1,3-butadiene and a styrene monomers in an appropriate solvent these monomers may be made to copolymerize to homogeneous, fusible copolymers which range in consistency from a gummy oil to an easily powdered solid, dissolve in aromatic and chlorinated hydrocarbons, and are suitable for use in spirit varnishes.

This new result is particularly unexpected in view of the fact that boron fluoride catalyst, when used in the polymerization of styrene alone at low or moderate temperatures, produces low molecular weight brittle polystyrenes, while in the polymerization of butadiene under the like conditions it causes the formation of cyclic unsaturated liquid polymers.

In accordance with the present invention a solution of butadiene and styrene monomers in a suitable solvent is copolymerized by passing through it a stream of gaseous boron fluoride catalyst at a low or moderate temperature. The proper choice of the solvent for the monomer mixture is of primary importance for the production of our butadiene-styrene copolymers. The preferred organic solvents must be capable of holding the reactants in solution until a large proportion of the monomers become incorporated in the copolymer; likewise, these solvents must be capable of at least partially dissolving the copolymer. As the reaction proceeds and more boron fluoride catalyst is admitted, new monomer units are added and some cross-linking of the molecular chains takes place. At the instant just preceding the formation of a copolymer gel, the copolymerization is quenched, e. g., by stirring the reaction mixture into a caustic solution, and the final product may be recovered in consistencies ranging from a thick gum to a brittle, easily powdered, solid material, upon removing the solvent and moisture.

Various organic solvents, especially halogenated hydrocarbons, may be effectively used in producing the copolymers of the present invention. The optimum effects are found to be obtained with benzene, ethylene dichloride, and chloroform. When this latter solvent is employed, an almost quantitative yield of copolymer is obtained at the point of the incipient gel formation.

The time for interrupting the polymerization, i. e., the instant just preceding the formation of a copolymer gel or the time of incipient gel formation is determined by experiment for each particular set of conditions and proportions of the reactants, or yet the proper moment for interrupting the polymerization may be ascertained by carefully watching the increasing viscosity of the reaction mixture and quenching the reaction at the viscous stage but before gelation. When the reaction is interrupted at lower viscosities of the reaction mixture the resulting copolymer product has a gum-like consistency; if it is allowed to last longer, so as to give rise to a higher viscosity or incipient gel, a greater proportion of cross-linked molecules are formed, and the product is a solid which may be readily comminuted into a powder.

The boron fluoride catalyst should be supplied during a sufficiently long time and at a rate which insures an intimate contact of the catalyst with the reactants throughout the polymerization reaction.

The preferred range of temperatures for the copolymerization of the monomers in accordance with the present invention is between 60° and 0° C. at normal pressures; however, in a proper case, lower temperatures may be applied. Thus, while ordinarily gelation occurs in about 30 minutes after the initiation of the reaction, by lowering the reaction temperature it is possible to shorten the time of copolymerization and to reduce the amount of the catalyst required.

In general, the relative proportion of either butadiene or styrene in the reaction mixture may vary from about 5% to about 95% by weight of the total amount of comonomers. If the styrene component preponderates, the yields of copolymer are higher, as may be seen from the data in the table of this specification, and the product is more solid. Otherwise, variations in the amount of styrene comonomer do not markedly affect the reaction rate. In fact, mixtures of lower styrene content polymerize as readily as those containing 25% of styrene. Nor is high purity of the styrene monomer a prerequisite for the successful operation of the process of our invention.

The copolymerization is carried out by passing gaseous boron fluoride catalyst through the solution of butadiene and styrene in a suitable solvent. Care must be exercised in admitting the boron fluoride catalyst to insure a good dispersion thereof throughout the reaction mixture. The completion of the reaction is indicated by the decrease of the solvent reflux or by the increase in the temperature of the reaction mixture. At that moment the admission of boron fluoride is discontinued and the reaction is thoroughly quenched by stirring the mixture into a solution of sodium hydroxide or other suitable alkali, or yet by blowing the mixture with ammonia, just prior to the formation of a copolymer gel. Thereupon the solvent is removed in a steam-heated vacuum flash still, and any remaining solvent or moisture may be further eliminated in a vacuum drum-drying unit.

Data given in the table illustrate the tests of copolymerization of butadiene and styrene monomers.

zene and ethylene dichloride. It is only slightly soluble, or swelled, in cyclohexane and petroleum thinner, and insoluble in normal butane, butyl-acetate, ethyl and methyl alcohols and acetone. A solution of this copolymer containing normal drier, brushed on as a surface film, dries dust-free immediately upon evaporation of the solvent, tack-free within 2 to 5 hours, and becomes dry-hard after 2 days or more. The copolymer is inert to the action of alkalies, organic acids and the majority of inorganic acids.

On baking an enamel compounded with our butadiene-styrene copolymer dissolved in chloroform for 20 minutes at about 150° C., a tough, hard film is obtained, which favorably compares with other conventional baking films.

A particularly remarkable characteristic of our product is its homogeneity, particularly in the case where chloroform is employed as a solvent. This property in conjunction with a nearly quantitative yield, proves the fact of a complete copolymerization. Furthermore, the iodine numbers obtained for our copolymer product by the Wijs method indicate the presence of a large amount of unsaturation which can be provided only by the butadiene component.

Another important and valuable property of our new butadiene-styrene copolymer is its reactivity with natural and synthetic drying oils. When heated at ordinary varnish cooking temperature, i. e., higher than 260° C., with drying oils, such as linseed oil, dehydrated castor oil and perilla oil, in proportions of about 50 parts by weight of the oil to about 40 parts by weight of the copolymer resin, the copolymer of our invention forms a clear bead, thus indicating complete compatibility with the drying oil upon the completion of the "cook."

As an example, a highly satisfactory, light yellow, modified drying oil is obtained by thermal depolymerization—"cooking"—of 100 g. of our butadiene-styrene copolymer with 160 g. of linseed oil for 30 minutes at about 288° C.

Thus, while butadiene polymers, if used to modify drying oils, would ultimately yield brittle

TABLE

*Copolymerization of butadiene and styrene*

| Test No. | Solvent | Monomer Mixture | | | Flow Rate, in cc./min. | Time, in Min. | Temp., °C. | Yield in Per Cent | Product |
| --- | --- | --- | --- | --- | --- | --- | --- | --- | --- |
| | | Solvent, in cc. | Styrene, in cc. | Butadiene, in cc. | | | | | |
| 1 | $CHCl_3$ | 300 | 50 | 100 | 50 | 45 | 15–45 | Approx. 90 | Oil to gum at various stages. |
| 2 | $CHCl_3$ | 300 | 5 | 100 | 50 | 30 | 21–50 | Approx. 30 | Solid.[1] |
| 3 | $CHCl_3$ | 300 | 0 | 100 | 50 | 23 | 14 | 10–50 | Gum. |
| 4 | ⅔ $CHCl_3$+⅓ $CH_3Cl$ | 300 | 0 | 100 | 50 | 25 | −1 | 10–40 | Brittle solid.[2] |
| 5 | $CH_3Cl$ | 300 | 0 | 100 | 50 | 15 | −19 | 22 | Solid. |
| 6 | $CH_3Cl$ | 300 | 50 | 100 | 50 | 21 | −19 | 46 | Brittle solid.[2] |

[1] Incomplete reaction and only higher molecular weight products are recovered.
[2] Reaction mixture gelled in this time.

The copolymerization product obtained in the tests, under the conditions described in the table, varies in consistency from a thick gum to a hard, brittle, fusible powder and its molecular weight ranges from 500 to 10,000. It is yellow to white in color, and lacks the flexibility and elasticity of the heretofore known rubbery copolymers of butadiene and styrene. Its iodine numbers (Wijs) range from 50 to 200. The product melts within a wide range from 0° C. up to 300° C. and is soluble, or highly swelled, in chloroform, benzene unsatisfactory surface coatings, and while polystyrene is unreactive with drying oils, our butadiene-styrene copolymer may be successfully incorporated into drying-type surface coatings. The introduction of the styrene monomer residue into drying oils in the form of its copolymer with butadiene secures a superior strength and hardness of the resulting surface film, a lower water absorption by the film, a greater inertness of the film to acidic reagents and superior electrical characteristics.

This improvement in electrical characteristics, viz., a lower dielectric constant and a lower power factor of our modified drying oils render them particularly suitable for use as constituents of varnishes for high voltage wire insulation and in the coatings applied to high frequency electric circuits.

It is to be noted that other alkyl and halo-substituted styrenes, e. g. ortho-, meta-, and para-methyl styrene, para-chloro styrene and the like, as well as various alkyl and halo-substituted 1,3-butadienes, may be used with, and in place of, styrene and 1,3-butadiene, respectively, to yield their corresponding copolymers in accordance with the process of the present invention.

The conditions and proportions disclosed in the above description of our invention are to be treated only as exemplary, and it is to be understood that various modifications may be made therein without departing from the scope of the appended claims.

We claim:

1. A process for preparing a liquid to fusible-solid, hard, brittle copolymer of 1,3-butadiene and a styrene containing a single vinyl group, as distinguished from rubbery copolymers of butadiene and styrene, which comprises forming a solution in an organic solvent of said butadiene and of from 5 to 95% by weight of said styrene, based on the total weight of said butadiene and styrene monomers; catalytically copolymerizing said styrene and butadiene in said solution at a temperature between 0° C. and about 60° C. by passing gaseous boron trifluoride catalyst therethrough; interrupting said copolymerization not later than the instant of formation of a copolymer gel; and recovering from said organic solvent the copolymer which is at least partly soluble in chloroform.

2. A process as defined in claim 1, wherein said organic solvent for butadiene and styrene monomers is a halogenated hydrocarbon solvent.

3. A process as defined in claim 1, wherein said organic solvent for butadiene and styrene monomers is chloroform.

4. A process for preparing a liquid to fusible-solid, hard, brittle copolymer of 1,3-butadiene and a styrene containing a single vinyl group, as distinguished from rubbery copolymers of butadiene and styrene, which comprises forming a solution in an organic solvent of said butadiene and of from 5 to 95% by weight of said styrene, based on the total weight of said butadiene and styrene monomers; catalytically copolymerizing said styrene and butadiene in said solution at a temperature between 0° C. and about 60° C. by passing gaseous boron trifluoride catalyst therethrough; interrupting said copolymerization not later than the instant of formation of a copolymer gel by discontinuing the admission of boron fluoride catalyst and quenching said catalyst in the reaction mixture with a solution of caustic alkali; and recovering from the quenched solution the copolymer which is at least partly soluble in chloroform.

WILLIAM E. ELWELL.
RICHARD L. MEIER.

REFERENCES CITED

The following references are of record in the file of this patent:

UNITED STATES PATENTS

| Number | Name | Date |
| --- | --- | --- |
| 2,023,495 | Thomas | Dec. 10, 1935 |
| 2,185,656 | Waterman et al. | Jan. 2, 1940 |
| 2,252,333 | Rothrock | Aug. 12, 1941 |
| 2,317,858 | Soday | Apr. 27, 1943 |
| 2,338,741 | Soday | Jan. 11, 1944 |
| 2,438,340 | Johnson | Mar. 23, 1948 |
| 2,476,000 | Sparks et al. | July 12, 1949 |

FOREIGN PATENTS

| Number | Country | Date |
| --- | --- | --- |
| 349,499 | Great Britain | May 26, 1931 |